I. F. PECK.
MACHINE FOR MAKING AND SETTING HEEL AND SOLE PROTECTORS FOR BOOTS AND SHOES.
APPLICATION FILED MAY 19, 1900.

994,334.

Patented June 6, 1911.

6 SHEETS—SHEET 2.

Witnesses:
Oscar F. Hill
Edith J. Anderson

Inventor:
Ira F. Peck
by Macleod Calver & Randall
his Attorneys.

I. F. PECK.
MACHINE FOR MAKING AND SETTING HEEL AND SOLE PROTECTORS FOR BOOTS AND SHOES.
APPLICATION FILED MAY 19, 1900.

994,334.

Patented June 6, 1911.

6 SHEETS—SHEET 3.

Witnesses:
Oscar F. Hill
Edith J. Anderson

Inventor:
Ira F. Peck
By Macleod Calver Randall
his Attorneys.

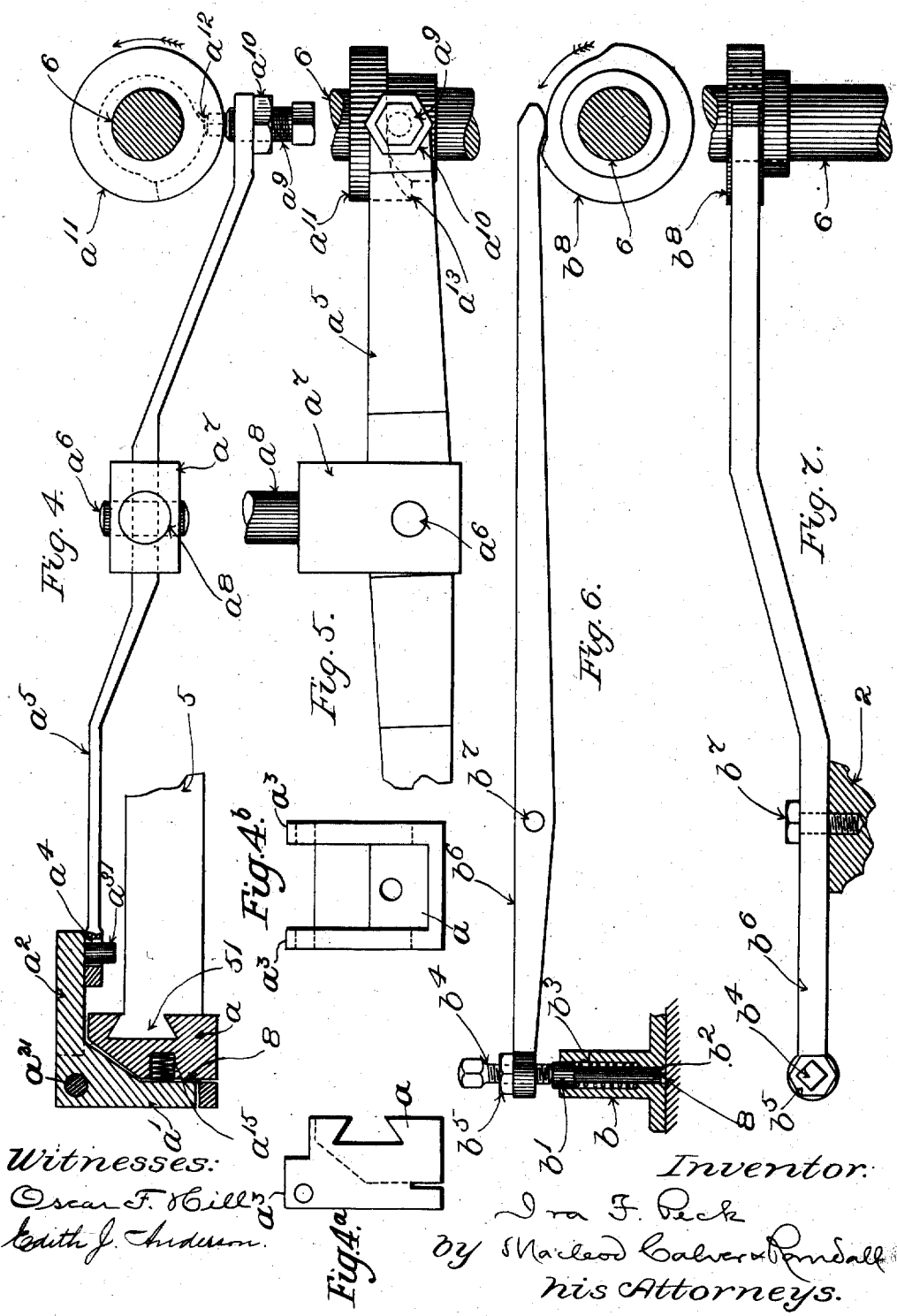

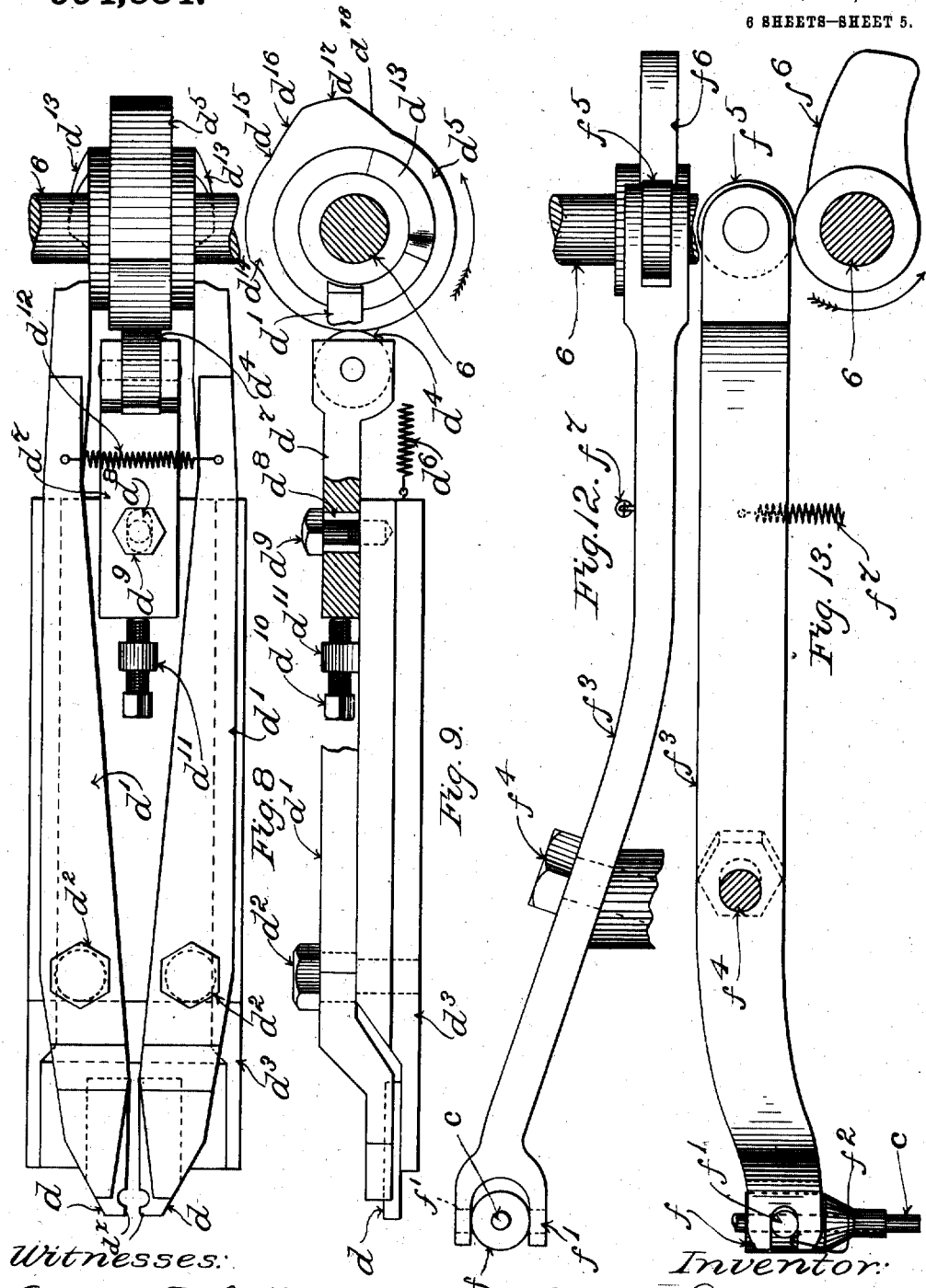

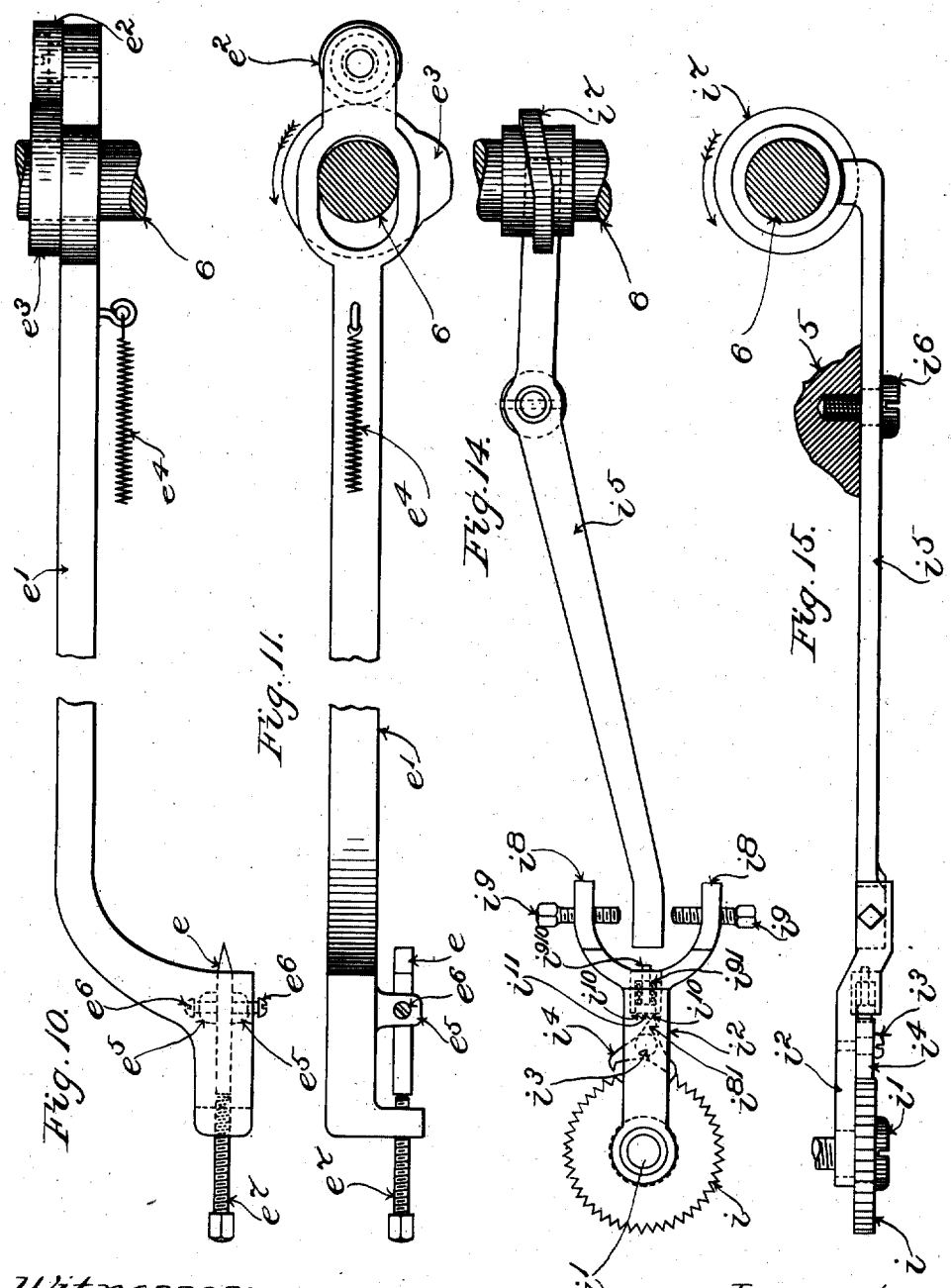

UNITED STATES PATENT OFFICE.

IRA F. PECK, OF WARWICK, RHODE ISLAND, ASSIGNOR TO THE SANFORD MANUFACTURING COMPANY, OF BOSTON, MASSACHUSETTS, A CORPORATION OF MAINE.

MACHINE FOR MAKING AND SETTING HEEL AND SOLE PROTECTORS FOR BOOTS AND SHOES.

994,334. Specification of Letters Patent. Patented June 6, 1911.

Application filed May 19, 1900. Serial No. 17,199.

*To all whom it may concern:*

Be it known that I, IRA F. PECK, a citizen of the United States, residing at Warwick, in the county of Kent, State of Rhode Island, have invented a certain new and useful Improvement in Machines for Making and Setting Heel and Sole Protectors for Boots and Shoes, of which the following is a specification, reference being had therein to the accompanying drawings.

The aim of the invention is to produce a machine which shall be operative to form protectors from a suitable strip of metal, and then drive the said protectors into the heels or soles of boots and shoes.

My machine, hereinafter described, in its most complete shape comprises instrumentalities for intermittingly feeding along the strip from which the protectors are to be produced, instrumentalities for cutting the said strip into short lengths suitable for the formation of the protectors, instrumentalities by means of which each short length is bent into the shape of a protector, instrumentalities by means of which the formed protector is driven into the stock that is held in position to receive the same, and instrumentalities by which the stock is supported in position to have a protector driven into the same, and also is fed along to enable successive protectors to be driven into the same at the required distances apart.

One form of my machine is illustrated in the accompanying drawings, in which latter,—

Figure 1:
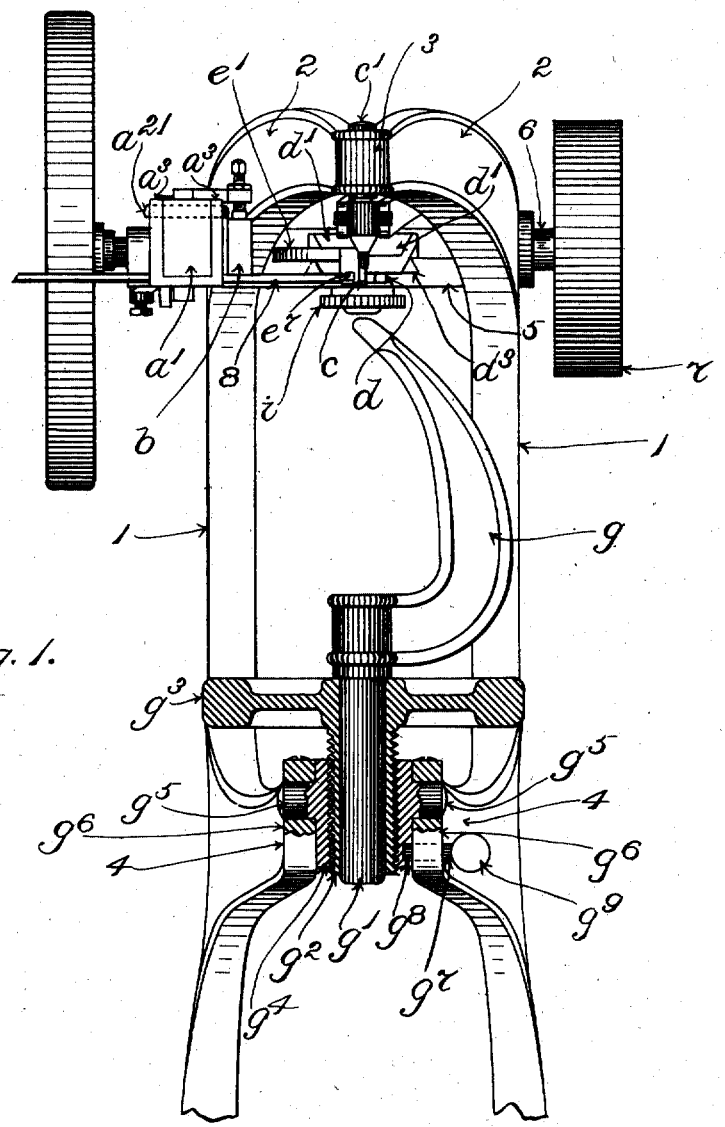
Figure 2:
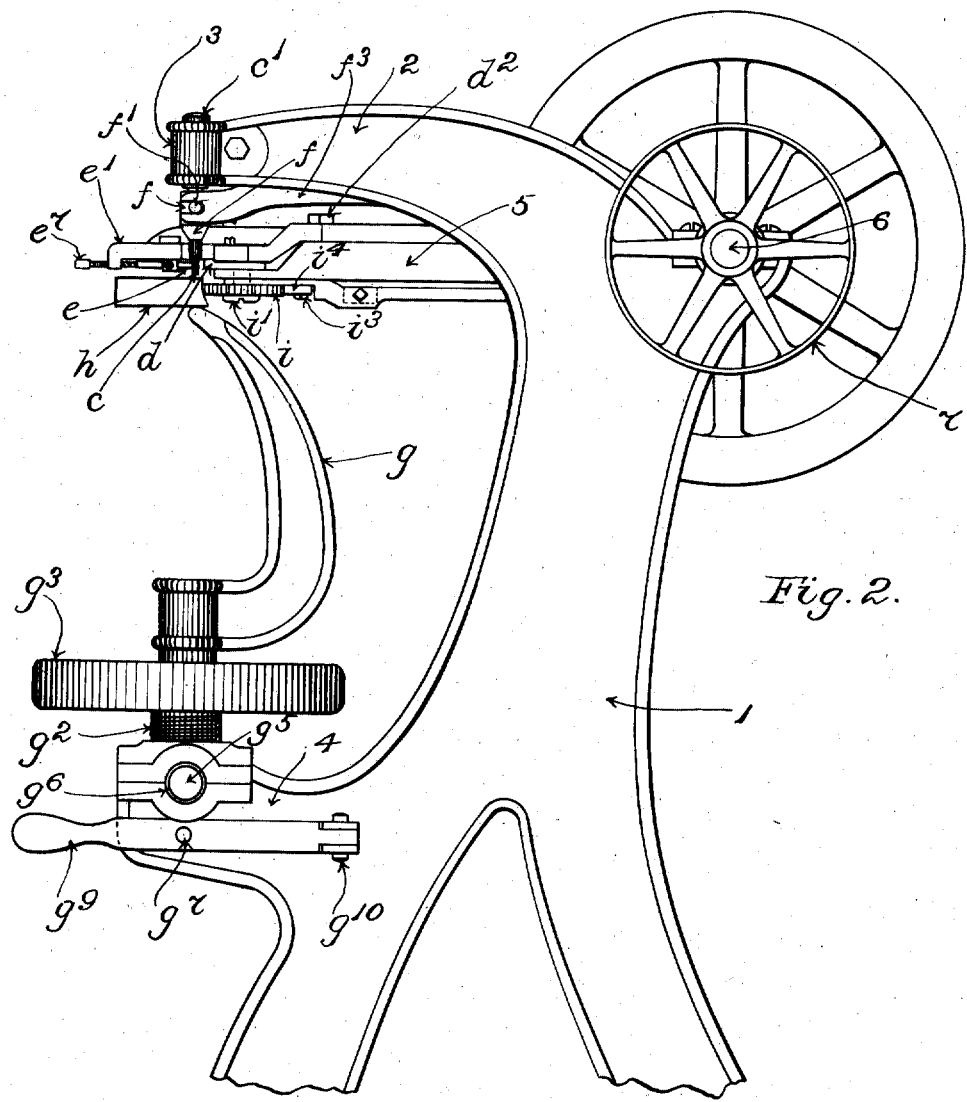
Figure 3:
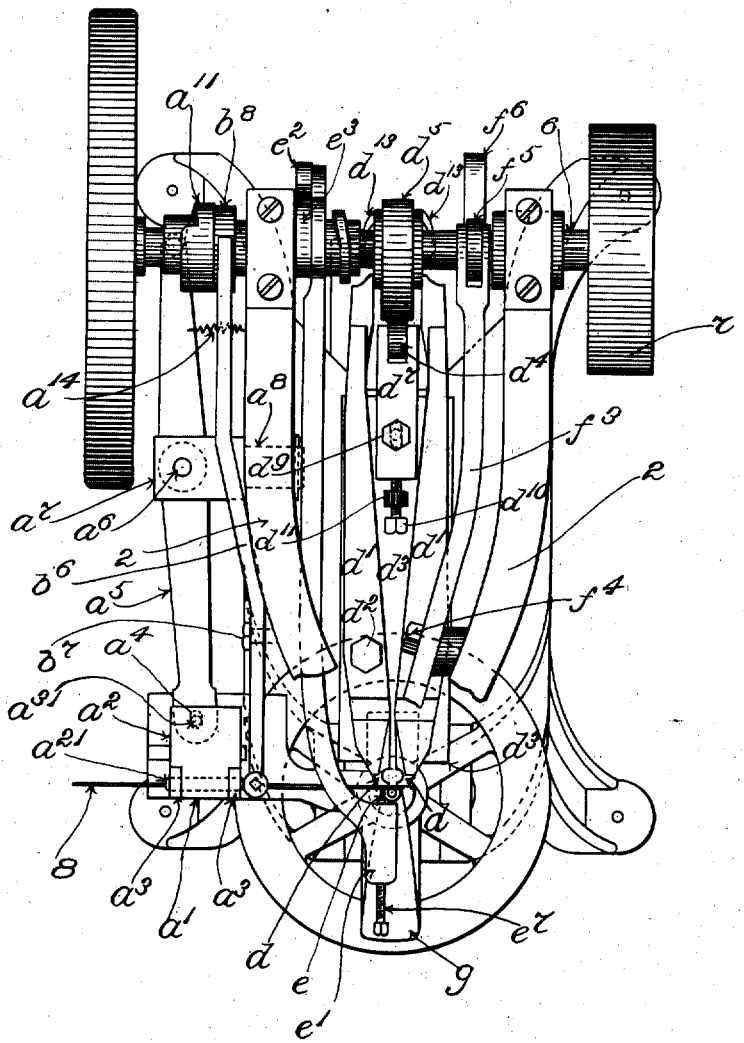

Figure 1 shows in front elevation, partly in vertical section, a machine embodying the invention. Fig. 2 shows the same in elevation, looking at the right hand side thereof. Fig. 3 is a plan thereof, with certain parts removed in order to show other parts which would be hidden. Figs. 4 to 15 are views of details to which reference is made in the course of the following description.

The machine is provided with a suitable frame, herein shown constituted chiefly of two side portions 1, 1. These are furnished at their tops with forwardly extending arms 2, 2, inclining laterally toward each other, their front ends approaching close together and being connected by a piece 3 to which reference will be made later. The said side-portions or side-frames are also furnished at a lower height with forwardly extending arms 4, 4, inclining inwardly somewhat toward each other and serving to sustain the work-support and the appurtenances thereof. Between the upper ends of the side-portions or side-frames 1, 1, is secured a horizontal table 5, constituting a support for some of the parts which are concerned in forming and driving the protectors. At the rear, the said upper ends are furnished with bearings for a driving-shaft 6. 7 is a pulley on driving shaft 6, receiving in practice a driving band for the application of power to actuate the machine. In practice, also, the pulley 7 will have combined therewith a clutch and clutch-controlling devices of well-known character, by means of which, at the will of the operator, the said pulley may be clutched to the driving shaft for one revolution of the latter.

The machine is designed to produce the protectors from a continuous strip of metal of suitable cross-section, and suitable proportions in its width and thickness. A portion of such a strip is indicated at 8 in the drawings.

The strip 8 is fed forward automatically in the machine. To this end I provide a feed-clamp and means for actuating the same. Fig. 4 shows the feeding devices detached partly in vertical section and partly in side elevation, on an enlarged scale, Fig. $4^a$ shows the base-member of the feed-clamp in side elevation, Fig. $4^b$ shows the said base-member in front elevation, and Fig. 5 is a bottom view of portion of the said actuating means. The feed-clamp comprises, essentially, the base-member $a$ and the relatively movable or pivoted member $a'$. See Fig. 4. The base member $a$ is formed with a dovetail groove therein fitting a dovetail rib or guideway 51 on the forward end of a portion of the horizontal table 5. The relatively movable member $a'$ is connected pivotally by a pin $a^{21}$, Figs. 1 and 4, with lugs or ears $a^3$ $a^3$, Figs. 1, 3, $4^a$, $4^b$, on the base member. In operation, the feed-clamp, it being in its retracted position, *i. e.*, to the left in Fig. 1, is caused to close upon the strip 8, then is caused to advance a distance corresponding with the length of material necessary to be used in the formation of a protector, then is caused to open to free the strip 8, and then is caused to return to its original position. For the convenient actuation of the feed-clamp, I provide the pivoted member $a'$ thereof with a horizontal rearwardly extending arm $a^2$, from which projects downwardly a pin $a^{31}$. The said pin enters a longitudinal slot $a^4$, Figs. 3 and 4, in the forward end of a lever $a^5$. The said end of lever $a^5$ extends under the arm $a^2$. The lever $a^5$ is mounted on a vertical pivot-pin $a^6$ in a horizontal slot that is formed in the block $a^7$ and extends through the latter from front to rear, the said block being connected with the upper arm of the adjacent side-frame 2 by means of a horizontal pivotal pin $a^8$. It will be clear that the described mode of mounting the lever $a^5$ renders it capable of swinging transversely on pivot-pin $a^6$, and also vertically on pivot-pin $a^8$. The lever $a^5$ has applied to the rear arm thereof a screw $a^9$, in connection with which latter a lock-nut $a^{10}$ is provided to prevent accidental loss of adjustment of the said screw. The tip of the screw $a^9$ engages with a cam $a^{11}$ on shaft 6. Cam $a^{11}$ is constructed with a portion $a^{12}$ of vertical throw and a portion $a^{13}$ of lateral throw. The spring $a^{14}$, Fig. 3, having one extremity thereof connected with the lever $a^5$ and the other with the adjacent side-frame 2, acts to turn the lever into the position which holds the feed clamp retracted. The cam-portion $a^{12}$ by acting against the end of screw $a^9$, operates to move lever $a^5$ vertically so as to turn jaw $a'$ of the feed-clamp upon its pivot and cause it to compress strip 8 against jaw $a$. The cam-portion $a^{13}$ by acting against screw $a^9$ swings the lever $a^5$ horizontally and advances the closed clamp to occasion the feed of the strip 8. Spring $a^{15}$, seated in a recess that is formed in jaw $a$ of the feed-clamp for its reception, and acting against the pivoted jaw $a'$, operates to open the feed-clamp when permitted by the cam-portion $a^{12}$. Screw $a^9$ enables adjustment to be effected to provide for variation in the approach of jaw $a'$ toward jaw $a$, to agree with the thickness of the strip 8.

For the purpose of holding the strip 8 against displacement during the retraction of the feed-clamp and until the next feed-movement, I provide check-devices, which are shown in place in the machine in Figs. 1 and 3, and separately in Figs. 6 and 7. Fig. 6 is a partly sectional side elevation thereof, and Fig. 7 shows the same in plan. A small stand $b$ is provided on the front of table 5, this stand being bored vertically for the reception and movement of a plunger $b'$. The lower end of the said plunger is notched, as at $b^2$, Fig. 6 to fit over the edge of the strip 8. A spring $b^3$ interposed between the head of the plunger and a shoulder on the interior of the stand $b$, acts with a tendency to raise the plunger so as to render the strip 8 free to be advanced in the machine. For the purpose of enabling the plunger to be depressed, to cause it to grip and hold the strip 8, a screw $b^4$ provided with lock-nut $b^5$ is applied to the forward arm of a lever $b^6$. The tip of the said screw is arranged to act against the upper end of the plunger $b'$. The lever $b^6$ is pivoted by means of a screw $b^7$ to the upper arm of the adjacent side-frame 2, and its rear arm is arranged to be engaged by the cam $b^8$ on shaft 6.

The machine shapes the protectors by the coöperation of forming devices which consist of an inside former that is constituted by a forming arbor, and an outside former that comprises two movable members or jaws which are adapted to close about the said forming arbor. The forming arbor is designated $c$ in Figs. 1, 2, 12 and 13, and the forming jaws are shown at $d$, $d$, Figs. 1, 2, 3, 8 and 9. In the operation of the machine, the leading end of the strip 8 is fed in between the forming arbor and the outer ends of the forming jaws $d$, $d$, a sufficient length of the said strip to form a protector being severed from the strip by a cutter, presently to be described, whereupon a relative movement of the forming members with respect to each other is occasioned, causing the arbor to enter between the jaws, effecting a preliminary bending of the protector-blank. Next the jaws are closed about the arbor to complete the formation of the protector from the blank, after which the jaws are opened and a further relative movement of the forming members with respect to each other separates the said members, withdrawing one thereof and leaving the protector held by the other. In the present embodiment of the machine, the relative movement of the forming members with respect to each other is secured by mounting the forming arbor in a fixed position within the machine, and the forming jaws upon a movable support that is constituted by a slide. The stock $c'$ of the arbor is shown in Figs. 1 and 2 fixed in the piece 3 which connects the forward extremities of the upper arms of the side-frames 2, 2.

Fig. 8 shows in plan the jaws and the means for supporting and operating the same. Fig. 9 is a partly sectional side elevation thereof. The jaws $d$, $d$, are provided on the forward extremities of jaw-levers $d'$, $d'$, the latter being pivoted at $d^2$ $d^2$ upon the slide aforesaid, the latter being designated $d^3$. The lower part of the said slide is of dovetail shape and fits a corresponding guideway in table 5, as indicated in Figs. 1 and 3. Slide $d^3$ carries a roller $d^4$ which is acted upon by a cam $d^5$ on shaft 6. The said cam acts to advance the slide toward the front of the machine. A spring $d^6$ Fig. 9, connected with slide $d^3$ acts in opposition to the cam $d^5$, and holds the roller $d^4$ in contact with the periphery of the latter. For convenience in effecting adjustment of the position of the jaws $d$, $d$, relative to the forming arbor $c$, the roller $d^4$ is pivoted on a stand $d^7$, the latter having a longitudinal slot $d^8$ therein, through which slot passes the stem of a bolt $d^9$ serving to secure the stand to the top of the slide. The adjustment of the stand upon the slide is determined by means of an adjusting screw $d^{10}$ working in a threaded hole through lug $d^{11}$ on the slide, and making contact by its tip against the end of the stand $d^7$. Normally, the forming jaws $d$, $d$, are held spread apart, as in Fig. 8, by the action of the spring $d^{12}$, Fig. 8, by which the rear arms of the levers $d'$, $d'$, are connected together. The closing of the said jaws is occasioned by the engagement of wing-cams $d^{13}$ $d^{13}$, located at opposite sides of the cam $d^5$ on shaft 6, with the extremities of the rear arms of levers $d'$, $d'$. After the said wing-cams have been carried by their rotation out of engagement with the said arms, the jaws are opened again through the action of the spring $d^{12}$.

The cam $d^5$ has a grade $d^{14}$, Fig. 9, which acts to advance the slide $d^3$ far enough to enable the ends of the jaws $d$ $d$ to press the end-portion of strip 8 against the rear surface of the forming arbor $c$, as in Fig. 3. The said cam has a dwell, $d^{15}$, which acts to hold the parts in this position, keeping the strip pressed firmly in contact with the arbor, while the cutter acts to sever such end-portion from the remainder of the strip. The cam has, in addition, the grade $d^{16}$, Fig. 9, by means of which the advancing movement of the slide is completed, thereby bending the severed portion of strip partly around the arbor, and a dwell $d^{17}$ by means of which the slide is held forward while the jaws $d$ $d$ are closed by the action of wing-cams $d^{13}$ $d^{13}$ to complete the bending of the severed portion of strip into protector form. The grade $d^{18}$ of the cam $d^5$ permits the slide to be moved rearwardly under the action of spring $d^6$, withdrawing the forming jaws and leaving the protector upon the forming arbor $c$.

In order to enable the free ends of the protector to be caused to occupy positions directed toward each other, the movable forming members $d$, $d$, are furnished with inwardly-extending lips $d^\times$, $d^\times$, Fig. 8, for engagement with the extremities of the blank. In the operation of the machine, the movement of the jaws $d$, $d$, and arbor $c$ relative to each other causing the middle portion of the blank to be forced between the said jaws, leaves the ends of the blank sustained by the lips $d^\times$, $d^\times$, after which the closing of the jaws about the forming arbor causes the said lips to bend the ends of the blank inwardly toward each other.

The cutter, by means of which the portion requisite to form a protector is severed from the strip 8, is shown at $e$, Figs. 2, 3, 10 and 11. It is carried by a cutter-bar $e'$, the latter being provided with a roller, $e^2$, which is engaged by a cam $e^3$ on shaft 6. Fig. 10 is a plan of the cutting devices, and Fig. 11 a side elevation thereof. By the action of the said cam $e^3$ the cutter is moved rearwardly and caused to sever strip 8 against the end of one of the forming-jaws $d$. A spring $e^4$, Fig. 11, acts to return the cutter-bar to its forward position after the cam $e^3$ has acted. The blade of the cutter $e$ is fitted between a pair of depending lugs $e^5$ $e^5$ on cutter-bar $e'$, and held in place by clamping-screws $e^6$ $e^6$. An adjusting screw $e^7$ fitted to a threaded hole through a lug at the forward end of cutter-bar $e'$ acts against the butt end of the cutter, and enables the latter to be adjusted as required. It also holds the cutter from moving endwise under the stress which is incident to the performance of its work.

The forming arbor $c$ serves as a guide for the protector in being driven into the stock which is designed to receive the same. For the purpose of driving the protector, a tubular driver $f$ is provided. Fig. 12 is a plan of the driver and its actuating means. Fig. 13 is a side elevation thereof. The driver $f$ surrounds the forming arbor, and is arranged to slide lengthwise of the latter. For the purpose of operating the driver, its enlarged upper portion is provided with oppositely projecting pins $f'$ $f'$ working in longitudinal slots $f^2$ in the forked end of a lever $f^3$. The latter is pivoted by means of a screw $f^4$ to a projection from the upper arm of one of the side-frames 2 2, and at its rear extremity is furnished with a roller $f^5$ which is engaged by a cam $f^6$ on the shaft 6. A spring $f^7$ connected with lever $f^3$ acts to raise the driver $f$ after it has been depressed by the action of the cam $f^6$.

In connection with the devices for forming and driving protectors, I provide for the convenient support of the stock which is to receive the protectors. In the present instance I have arranged a horn, $g$, below the said devices, and upon the upper end of the said horn I have represented in Fig. 2, by way of illustration, a heel at $h$. The said horn supports the work beneath the forming arbor $c$ and driver $f$ in proper position to receive a protector as it is driven off the lower end of the said arbor by the descent of the said driver. The horn $g$ is furnished at its base with a supporting pin $g'$. The latter fits the inner bore of a sleeve $g^2$, and is free to turn therein. The said sleeve $g^2$ is furnished with a hand-wheel $g^3$ by means of which to turn the same in making adjustments, and is screw-threaded exteriorly as shown. The screw-threaded portion of the sleeve fits the screw-threaded opening of the hub $g^4$, and when turned, as by means of the hand-wheel $g^3$, is adjusted higher or lower, as the case may be, and thereby correspondingly raises or lowers the horn $g$. The hub $g^4$ is furnished with opposite trunnions $g^5$ $g^5$ fitting in bearings $g^6$ $g^6$ with which the lower arms of the side-frames 1, 1 are furnished, as shown best in Figs. 1 and 2. The said trunnions and bearings enable the work support to be swung forward from beneath the forming and driving devices into convenient position for the application of work thereto, or its removal therefrom. For the purpose of holding the work-support in its normal operative position, with its upper end in proper working relations with respect to the forming and driving devices, a lock is provided. Thus, Figs. 1 and 2, a pin or bolt $g^7$ is arranged to work through the lower arm of one of the side-frames, 1, 1 and to enter a hole $g^8$ in hub $g^4$ when the work-support has been swung into its proper working position. The said pin or bolt is provided with convenient means for operating the same, as, for instance, a lever-handle $g^9$ pivoted at $g^{10}$ to the said lower arm. See Fig. 2.

When a plurality of protectors are driven into the stock adjacent one another they should, in order that the finished work may present the most satisfactory appearance, be regularly spaced apart. For the purpose, therefore, of providing for regular spacing of the protectors, I provide means for feeding the stock. Thus, at $i$, Figs. 1, 2, 14 and 15, is shown a feed wheel, which is mounted upon the stem of a supporting screw $i'$ at the forward end of table 5, in convenient position below and adjacent the protector-forming and driving devices. The edge of this wheel is arranged in position to receive the pressure of the edge of the stock which is resting upon the upper end of the work-support. The said edge of the wheel preferably is toothed, as shown, for engagement with the said edge of the stock. A plan view of this wheel and its actuating means is given in Fig. 14 and a side elevation thereof in Fig. 15. For the actuation of feed-wheel $i$, I provide a pawl-carrier $i^2$, which is mounted pivotally upon the stem of the said supporting screw $i'$, the said pawl-carrier $i^2$ having connected with it by means of a pivotal screw $i^3$ a double or reversing pawl $i^4$ which last engages with the teeth of the said feed-wheel. For the purpose of communicating the requisite swinging movement to the pawl-carrier $i^2$, I employ in connection therewith an actuating lever $i^5$, which is mounted pivotally by the screw $i^6$ Fig. 15 upon the under side of table 5, the notched rear end of the said lever being in engagement with the wave-cam $i^7$ on shaft 6. The forward arm of lever $i^5$ plays between the arms $i^8$ $i^8$ of the forked end of the pawl-carrier $i^2$, and serves to transmit movement to the pawl-carrier positively in both directions. For the purpose of enabling the extent or amount of the feed to be varied from time to time, as required, adjusting-screws $i^9$ $i^9$ are applied to the said arms $i^8$ $i^8$, and the said forward arm of actuating lever $i^5$ is arranged to contact with the inner ends of the said screws. The pawl $i^4$ is made double, i. e., with an engaging arm at each side of the pivot thereof, and is capable of being swung upon the said pivot to bring either engaging arm thereof into engagement with the toothed feed-wheel $i$, according to the direction in which it is desired to rotate the said feed-wheel. For the purpose of maintaining the said pawl in yielding engagement with the said feed-wheel, in each of its positions of adjustment, the pawl is furnished with a V-shaped arm $i^{81}$, Fig. 14, and in connection with the said arm there is employed a bolt $i^{910}$, having on the head-end thereof the oppositely inclined diverging faces $i^{10}$ $i^{10}$, and pressed forward by means of a spiral spring $i^{91}$ contained in a cavity within the pawl-carrier. The said faces are intended to engage, respectively, with the opposite sides of the said V-shaped arm $i^{81}$, according to the position which has been given the pawl $i^4$ by hand, and by pressure thereagainst to hold the pawl yieldingly in such position. The bolt readily yields when force is applied by hand to the pawl to shift the latter from one operative position thereof to the other. An intermediate notch $i^{11}$ in the head of the bolt $i^{910}$ is designed to receive the end of the V-shaped arm $i^{81}$ when it is desired to retain the feed-pawl $i^4$ in an inoperative intermediate position, which position will be given thereto by hand when, for any reason, it is desired to throw the feeding devices out of action during the working of the machine.

It will be obvious that various changes may be made in the form, construction and arrangement of the parts of the described machine without involving departure from the principles of the invention.

I claim as my invention:—

1. An outside former comprising relatively movable members and opened vertically at one side, an inside former, means to move said outside and inside formers relatively to bend a protector blank, means independent of the outside former to close the members of the outside former about the inside former to complete the formation of the protector from the blank, means to withdraw the outside former, leaving the protector held by the inside former and means to drive the protector from the inside former into the work.

2. An outside former, an inside former, means to move the formers relatively to cause them to bend a blank into the form of a protector having inwardly bent end portions, means to withdraw the outside former leaving the protector sustained by the inside former, a driver, and means to actuate it to force the protector from the inside former into the work.

3. In a machine for forming and driving protectors, an outside former having inturned lips to sustain a protector blank near its ends while said blank is being shaped, an inside former, means to move the two formers relatively for bending the protector blank into the outside former, means to move the outside former to close the blank about the inside former, means to withdraw the outside former from the protector leaving said protector held by the inside former, and a driver to force the protector from the inside former into the work.

4. In combination, a work-support to sustain the stock into which protectors are to be driven, a forming arbor, jaws to shape strip-metal upon the said forming arbor, and a driver to drive the protectors from the said arbor into the said stock, substantially as described.

5. In combination, a work-support to sustain the stock into which protectors are to be driven, a forming arbor constituting a guide for the protectors in being driven into the said stock, jaws to shape strip-metal upon the said arbor, and a driver to drive the protectors from the said arbor into the said stock, substantially as described.

6. In combination, a work-support, a forming arbor, devices to feed forward strip material and sever it into lengths suitable for the formation of protectors, means to shape such lengths into protectors upon the said arbor, and a driver to drive the protectors from the said arbor into the said stock, substantially as described.

7. In combination, the feed-clamp comprising the movable base-jaw and the pivoted jaw, the actuating lever in operative engagement with said pivoted jaw and mounted to move both vertically and transversely, and the cam in operative control of said lever and constructed to move the latter both vertically and transversely, substantially as described.

8. In combination, devices for severing a portion from a strip of stock, forming a winged protector therefrom, and driving the protector thus formed, the feed-clamp, the spring acting to open the feed-clamp, the lever operating to close the feed-clamp and also reciprocate the same, means to operate the lever, the check which holds the strip during the retrograde movement of the feed-clamp, a lever carrying the said check, and an actuating cam for the said lever.

9. In combination, devices for severing a portion from a strip of stock, forming a winged protector therefrom, and driving the protector thereby produced, the feed-clamp, the spring operating to open the same, and the lever having movements in directions at right angles to each other and operating to close the feed-clamp and also reciprocate the same for the purposes of the feed, and the check engaging with the strip and leaving the latter free during the feed movement thereof, substantially as described.

10. In combination, the severing and forming devices, the feed-clamp and means to operate the same, the check-bolt notched to engage the strip, and means to actuate the said check-bolt whereby the said strip is left free during the feed movement thereof, substantially as described.

11. In combination, the feeding devices, the cutter, the slide-bar provided with a clamp for the said cutter, the actuating cam for the said slide-bar directly moving the same endwise, the adjusting screw in line with the cutter and acting against the butt end of the latter to provide for lengthwise adjustment thereof, devices for forming the piece detached by the cutter into a winged protector, and the protector-driving devices.

12. In combination, the forming-arbor, the forming-jaws, means to actuate the said forming-jaws, feeding devices for the strip, a cutter, and means to actuate said cutter to sever the end-portion of the strip while the said end-portion is held pressed by the said forming-jaws against the forming-arbor, substantially as described.

13. In combination, the forming-arbor, the forming-jaws, feeding devices for the strip, a cutter, and actuating means for the said forming-jaws by which the latter are first advanced to press the end-portion of the strip against the forming-arbor and then are caused to complete their movement, and means to actuate said cutter to sever said end-portion while thus held pressed against the forming-arbor, substantially as described.

14. In combination, the forming-arbor, the pivotally-mounted forming-jaws, the carrier for the said forming-jaws, means to move the carrier, means to move the forming-jaws transversely, and the cutting device by which the strip is severed, said device coacting with one of said forming-jaws.

15. In combination, the forming-arbor, the forming-jaws, the carrier on which the said forming-jaws are mounted pivotally, the cam by which the carrier is moved, the cams by which the forming-jaws are moved transversely, and the cutting device by which the strip is severed while held pressed by the forming-jaws against the forming-arbor, substantially as described.

16. In combination, the work-support, the driver, the feed-wheel having a toothed edge and located in position to be engaged at its said edge by the edge of the stock resting on the work-support, a pawl and pawl-carrier for rotating the said feed-wheel, an actuator in loose connection with the pawl-carrier, with lost motion between them, and through which a swinging movement is communicated to the pawl-carrier, and means to vary the amount of lost motion between the said actuator and the pawl-carrier, to thereby adjust the feed.

17. In combination, the work-support, the driver, the feed-wheel having a toothed edge and located in position to be engaged at its said edge by the edge of the stock resting on the work-support, the pawl-carrier and reversing pawl, the actuating lever and means to operate said lever, and an adjusting screw between such lever and the pawl-carrier to vary the stroke of the pawl-carrier, substantially as described.

18. In combination, the work-support, the driver, the feed-wheel having a toothed edge and located in position to be engaged at its said edge by the edge of the stock resting on the work-support, the pawl-carrier and reversing pawl, and means to actuate the said pawl-carrier, substantially as described.

19. In combination, the work-support, the driver, the feed-wheel having a toothed edge and located in position to be engaged at its said edge by the edge of the stock resting on the work-support, the pawl-carrier and reversing pawl, the spring-actuated bolt acting to hold the said reversing pawl in its different positions, and means to actuate the said pawl-carrier, substantially as described.

20. In combination, the work-support, the driver, the feed-wheel having a toothed edge and located in position to be engaged at its said toothed edge by the edge of the stock resting on the work-support, the pawl-carrier and reversing pawl, the actuating lever for transmitting motion to the said pawl-carrier, means to actuate said lever, and means to vary the operative stroke of the pawl, substantially as described.

21. In combination, the work-support, the driver, the feed-wheel having a toothed edge and located in position to be engaged at its said toothed edge by the edge of the stock resting on the work-support, the pawl-carrier and reversing pawl, the actuating lever for transmitting motion to the said pawl-carrier, the adjusting screws for varying the amount of movement transmitted to the pawl-carrier, and means to operate the said actuating lever, substantially as described.

22. In combination, a work-support, protector driving devices, a feed-wheel and reversible means for rotating said feed-wheel.

23. In combination, a work-support to sustain the stock into which a protector is to be driven, a driver, a feed-wheel engaging by its edge with the said stock, a reversible dog or pawl for actuating the said feed-wheel, and operating means for the said dog or pawl.

24. In combination, the work-support, the driver, the horizontal feed-wheel having the toothed edge and engaging by the said edge with the stock resting on the work-support, a dog or pawl engaging with the said edge of the feed-wheel, a swinging carrier for the said dog or pawl, a lever to actuate the said carrier, and means intermediate the lever and pawl-carrier to adjust the extent of the swinging movement of the said carrier.

25. In combination, feeding devices for the strip, severing devices for the strip, the forming-arbor, means to shape a protector upon the said forming-arbor, the tubular driver fitting upon the said forming-arbor, and means to actuate the said driver substantially as described.

26. In combination, the forming-arbor, the forming-jaws, means to actuate the said forming-jaws to shape a protector upon the said forming-arbor, the driver fitting upon the said forming-arbor, and means to actuate the said driver, substantially as described.

In testimony whereof I affix my signature, in presence of two witnesses.

IRA F. PECK.

Witnesses:
CHAS. F. RANDALL,
WILLIAM A. COPELAND.

---

Copies of this patent may be obtained for five cents each, by addressing the "Commissioner of Patents, Washington, D. C."

Correction in Letters Patent No. 994,334.

It is hereby certified that Letters Patent No. 994,334, granted June 6, 1911, upon the application of Ira F. Peck, of Warwick, Rhode Island, for an improvement in "Machines for Making and Setting Heel and Sole Protectors for Boots and Shoes," were erroneously issued to "The Sanford Manufacturing Company, of Boston, Massachusetts, a corporation of Maine," whereas they should have been issued to *United Shoe Machinery Company, of Paterson, New Jersey, a corporation of New Jersey;* said corporation being owner *by mesne assignments* of the entire interest in said invention as shown by the records of assignments in this office; and that the said Letters Patent should be read with this correction therein that the same may conform to the records of the case in the Patent Office.

Signed and sealed this 18th day of July, A. D., 1911.

[SEAL.]

E. B. MOORE,
*Commissioner of Patents.*